Figure 1:
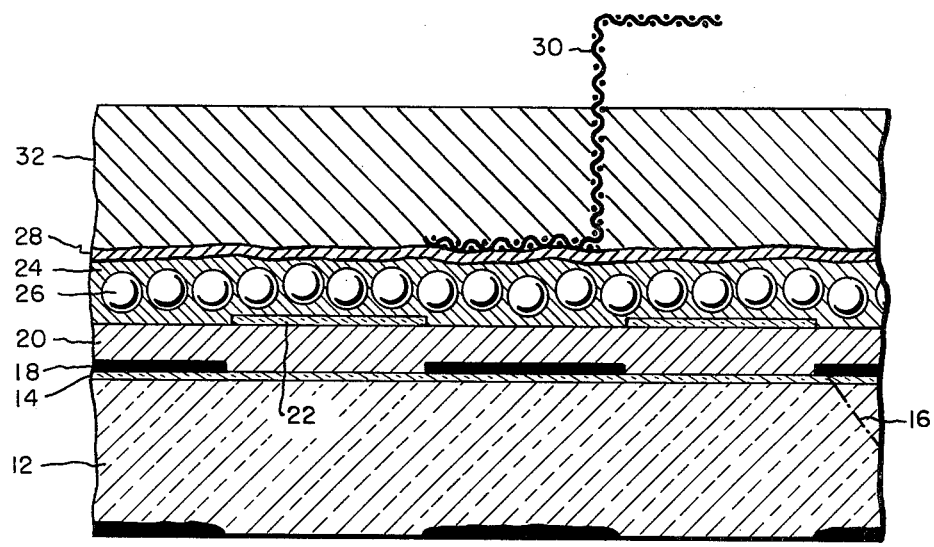

Jan. 4, 1966   K. H. BUTLER ETAL   3,227,883
ELECTROLUMINESCENT LIGHT AMPLIFIER
Filed Jan. 4, 1960   5 Sheets-Sheet 1

INVENTORS
KEITH H. BUTLER
DAVID L. COLE
RICHARD M. RULON
BY KENWAY, JENNEY, WITTER & HILDRETH

ATTORNEYS

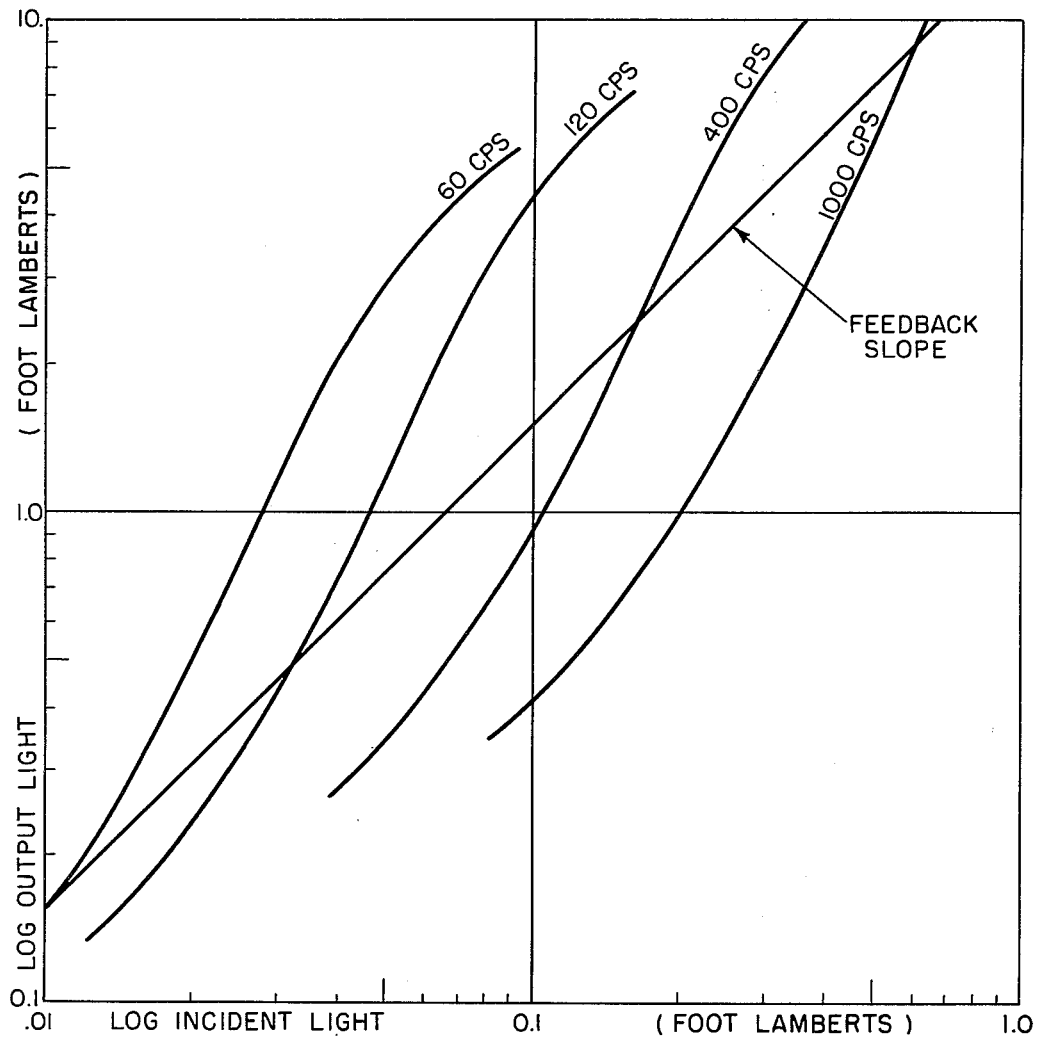

United States Patent Office 3,227,883
Patented Jan. 4, 1966

3,227,883
ELECTROLUMINESCENT LIGHT AMPLIFIER
Keith H. Butler, Marblehead, David L. Cole, Boxford, and Richard M. Rulon, Salem, Mass., assignors to Sylvania Electric Products Inc., a corporation of Delaware
Filed Jan. 4, 1960, Ser. No. 354
3 Claims. (Cl. 250—213)

This invention relates in general to the storage, amplification or conversion of radiant energy and in particular to devices for the amplification, conversion or storage of light and to a method of fabricating such devices.

Considerable interest has developed and a great deal of effort has been expanded in recent years in the field of light amplification and storage. The obvious potential market for light amplifiers in the television art is matched or exceeded by the potential market for information storage in the computer art. Almost all of the practical devices developed for either purpose are of the same generic type utilizing a layer of photoconductive material and a contiguous or near-contiguous layer of electroluminescent material. An exciting voltage is applied across the two layers in series and a voltage drop composed of the vector sum of the voltage drops across each layer then exists. Light falling upon the layer of photoconductive material causes its resistance to be lowered and the voltage drop across the photoconductive layer drops while that across the electroluminescent layer increases causing the latter to emit light of an intensity corresponding to the voltage change. Various effects may be obtained by varying magnitude and frequency of applied voltage, and still greater variation of effects may be obtained by changes in structural design.

Two conflicting requirements are encountered in the manufacture of devices of the type to which the invention pertains. Both of these requirements relate to the photoconductive material which is utilized. Most photoconductive materials used in such devices are not transparent. In fact, many such materials are actually dark in color, and light and other forms of energy are often seriously attenuated as they pass through a layer of photoconductive material of any significant thickness. It would seem obvious that difficulties with transparency could be minimized by making the layer of photoconductive material as thin as possible. However, if too thin a layer of photoconductive material is used, electrical problems arise. From the brief outline of the operation of conventional light amplifiers given above, it is clear that the resistance changes of operable magnitude in the photoconductive layer in response to incident light would be impossible of attainment if the layer were not of sufficient thickness. In brief, it would be eminently desirable to provide a photoconductive layer which is electrically thick and optically thin. In other applications of the subject device, particularly in the field of computers and in data storage and display devices, additional requirements must be met. For example, if letters are to be represented on the face of the device, cross talk between various discrete areas of the device must be held to an absolute minimum. Otherwise, blurring and resulting ambiguity of displays would result.

It is with the provision of a suitable amplifying, converting and storing device that avoids the difficulties outlined that the present invention is concerned, and the production of such a device is the primary object of the present invention.

It is another object of the present invention to simplify and standardize fabrication techniques for energy-storing amplifying and display devices.

It is a further object of the present invention to eliminate substantially cross talk in image reproduction and display devices.

It is a still further object to provide a versatile and practical light amplifier and display device.

The present invention in its aspects as a light storage device is organized about a structure laminated in a manner which is known in the art of energy-responsive devices, but in which significant departures are made from conventional techniques. The photoconductive layer itself is rendered electrically thick and optically thin by the inclusion in that layer of tiny transparent members. An opaque webbing is used in conjunction with the electroluminescent layer of the device, and transparent conductive patches are formed over the areas from which light is to be emitted. The photoconductive layer is subjected to a sintering treatment to provide heavy but uniform density, and the conventional foil or mesh contacts are replaced by gold leaf. If the device is to be back-triggered, the gold leaf must be thin enough to be transparent to the incident triggering energy. The combination of these improvements results in a unit of uniform high performance specifications.

Where the concepts of the present invention are applied to the fabrication of light amplifiers or image converters, certain changes are desirable. The components by which the photoconductive layer is rendered electrically thick and optically thin are retained, but the black webbing and transparent conductive patches are unnecessary. Regenerative action by light from the electroluminescent layer upon the photoconductive layer is, of course, undesirable in a light amplifier or image converter, and to prevent such feed-back or regeneration, an opaque layer is interposed between the photoconductive and electroluminescent layers. Again, however, the transparent members in the photoconductive layer function to improve contrast by electrically increasing the thickness of the photoconductive layer while permitting optical penetration which creates a higher conductivity when the layer is sensitized.

Figure 2:
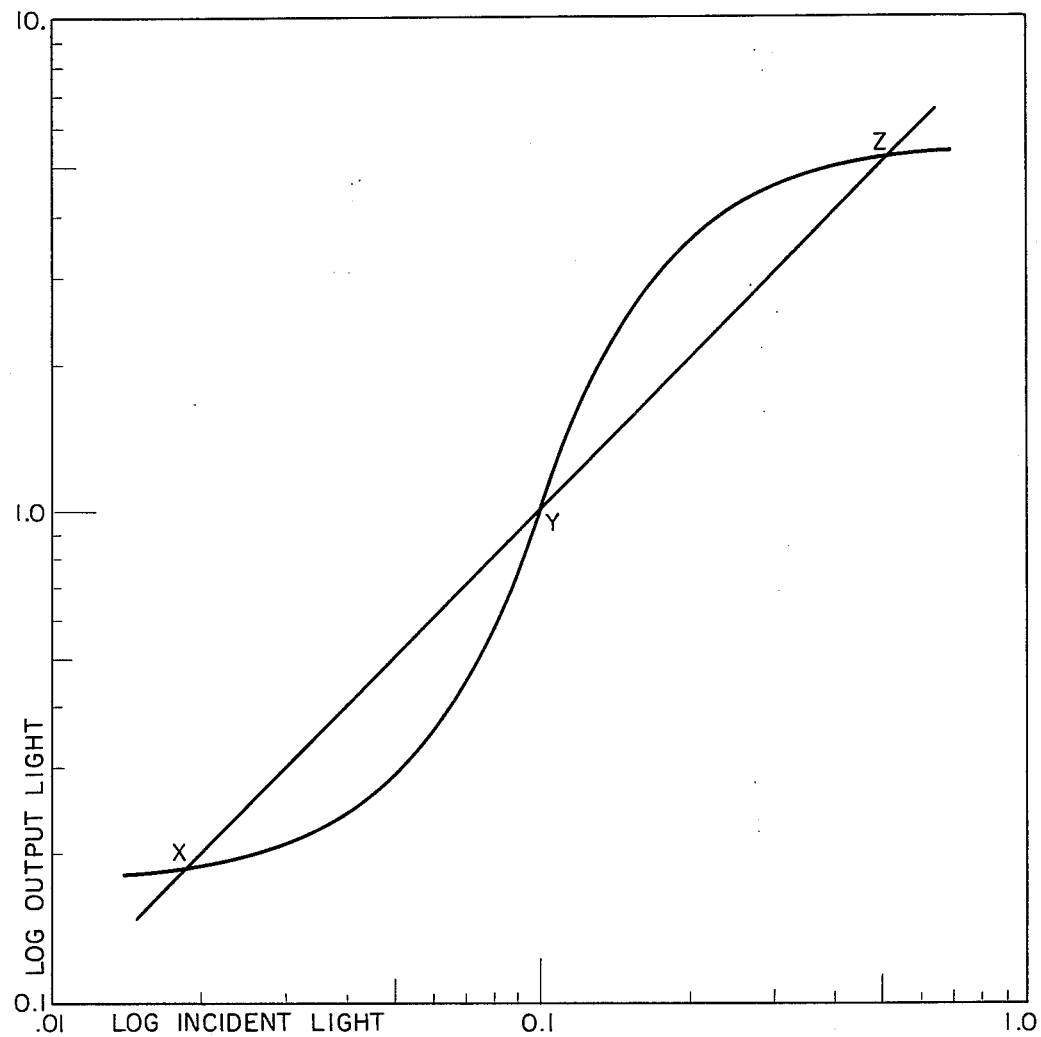
Figure 3:
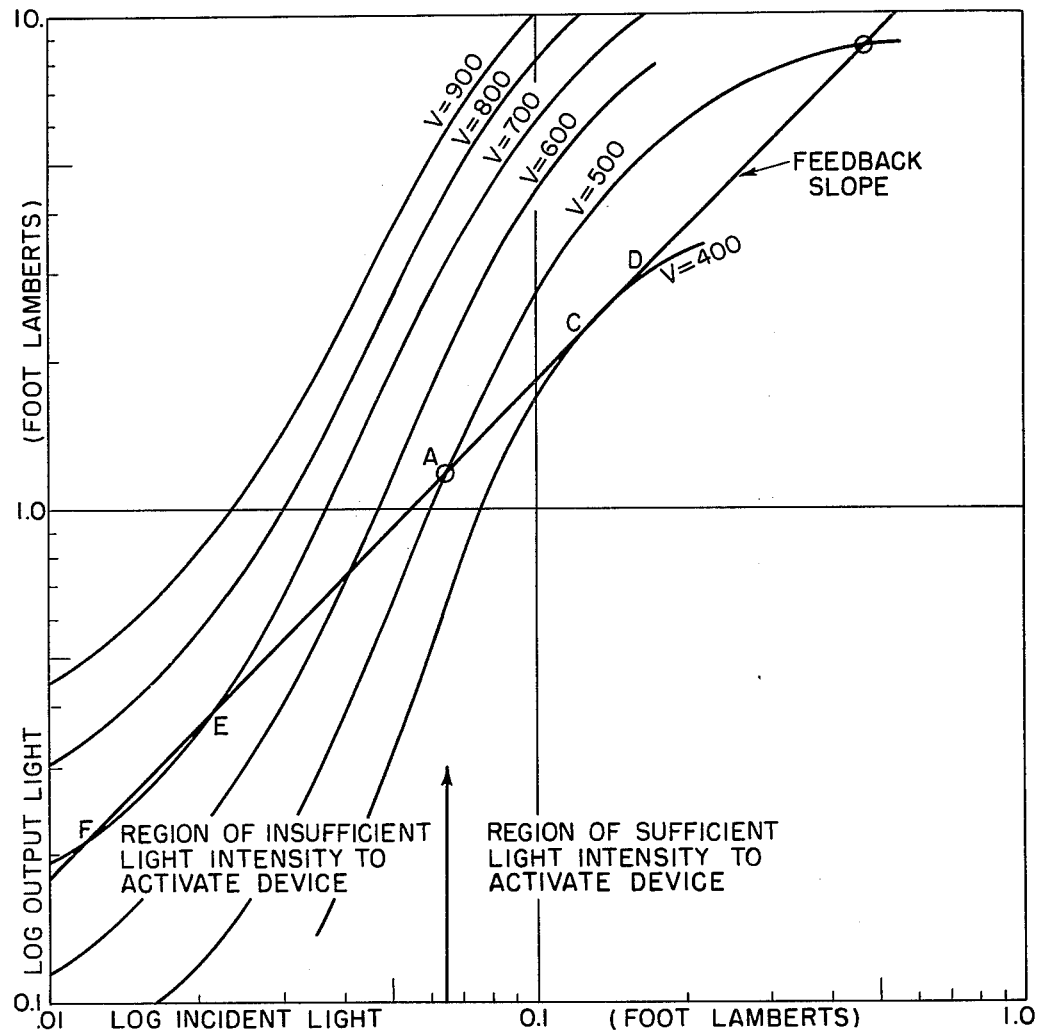
Figure 4:
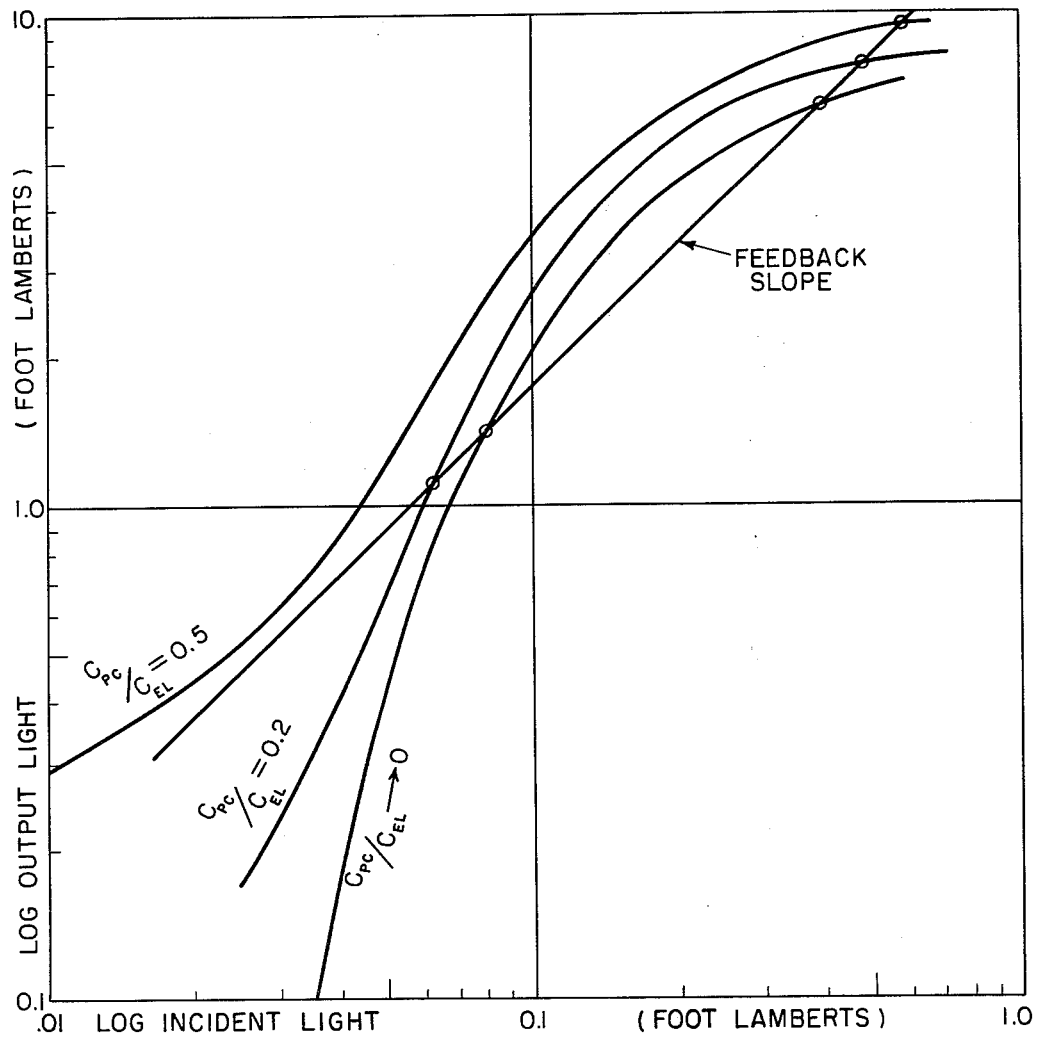

These and other advantages, features and objects will become apparent from a reading of the following specifications of a particular embodiment of the invention which should be read in connection with the appended drawing in which:

FIG. 1 is a schematic illustration of a laminated device for light amplification, storage and conversion, FIG. 2 is an idealized performance graph, and FIGS. 3 through 5 are graphs of typical performance curves of devices made in accordance with the invention.

In FIG. 1, one such laminated device is shown in section. Actually, several of the dimensions have been exaggerated for facilitating understanding of the invention. The storage device there illustrated includes a base plate 12 which may be made of glass or other suitable transparent material. On the upper surface of the glass a transparent conductive film 14 is formed. The transparent conductive film may be formed of any one of several well-known compounds, and a thickness varying from less than $\frac{1}{1000}$ of an inch to a few-thousandths of an inch is suitable. As a specific example of a suitable material, the tin chloride disclosed in United States Patent No. 2,624,851 to Mager has been successfully used in the present invention. The film is applied by conventional methods; the glass base is thoroughly cleaned, then heated to about 600° C., following which the tin chloride solution is sprayed on the upper surface. This is done while the glass base plate is still at an elevated temperature in order that the proper transparency and conductivity may be attained.

To insure good contact with the transparent conductive film 14 in the finished device, it is helpful to bevel one edge of the glass base plate as is indicated at 16. Prior to the formation of the transparent conductive film, gold or other conductive material may be painted on the edge of the glass base plate and over the beveled area in order that an overlapping contact surface rather than a simple butted contact joint may be had.

Over the transparent conductive film 14 a black web 18 is formed. The configuration of the black web may be varied, but one suitable pattern is a basket weave which sets up substantially square cells between the borders formed by the web. One of the better ways to form the web in the desired pattern is by the silk-screening process although other methods such as those utilizing photoresist techniques are also feasible.

In any event, the web is deposited upon the transparent conductive film, and the whole assembly is fired at about 1240° F. The firing may be preceded by a bake-out at much lower temperature to drive off volatiles, but this bake-out is not essential. The firing may be conducted in air and should be continued for about seven minutes to make certain that all volatiles in the material are driven off. In this connection, it may be noted that the material from which the web is formed may be black frit. After the black web 18 is formed, an electroluminescent layer 20 is built up upon the structure. This layer may typically consist of an electroluminescent phosphor imbedded in a solid dielectric material. One such phosphor of the many which are suitable is the copper and lead activated zinc sulphide which is disclosed in United States Patent No. 2,728,730 to Butler et al. The dielectric material in which the phosphor is imbedded may be for example of the ceramic or glass type shown in an application of Rulon, Serial No. 365,617 pending in the United States Patent Office. The electroluminescent layer is preferably applied in a two-step process. Each layer may be of the order of 1/1000 of an inch, and a two-step process is adopted to insure full coverage without openings or bare spots.

The electroluminescent layer 20 is then coated with a second transparent conductive film 22. The film 22 may be applied in substantially the same manner as the first transparent conductive film 14, but other methods are also suitable. However, after a continuous film is formed on the electroluminescent layer, the film is masked in such a way that it may be blasted with sand, aluminum oxide, or other suitable abrasives to remove areas of the film lying above the black web 18. In other words, the blasting removes film portions to leave cell openings in the web surmounted by transparent conductive patches.

At this point, the underside of the glass base is given comparable treatment. That is, the lower surface of the glass base is abraded with similar masking. The abraded areas thus formed are aligned with the black web 18. The unabraded areas, of course, are in alignment with the cells and with the transparent conductive patches. The abraded areas in some instances are effective light diffusers simply because of the abrading process. Alternatively, the abraded areas may be darkened by the application of a black frit or other black pigment to block light transmission and internal reflection through the areas almost completely.

Over the transparent conductive patches 22 a photoconductive layer 24 is then formed. The materials from which the layer is formed may be composed of cadmium sulphide properly activated as, for example, by copper and halogens. Photoconductive layers in similar devices are usually formed by a spraying process in which the material is suspended in some such vehicle as benzene and nitrocellulose or ethyl cellulose with Xylol. In carrying out the present invention, for reasons which will be made apparent hereinbelow, no vehicle of the types listed above is used in the first application step. Rather, the photoconductive material is suspended in oil and sprayed upon the unit. The oil is preferably of high viscosity and one which may be subsequently "burned off" with only insignificant residue. A suitable oil for this purpose may be composed of a mixture of xylol and an oil sold under the trademark Pemco #336.

After the photoconductive material and oil are sprayed on the unit, glass beads such as 26 are poured over the surface of the layer 24. The presence of the oil causes the beads to adhere to the layer and to arrange themselves in a single layer. Should it be desired to provide a thicker photoconductive layer, a second layer may be added to the first in the same fashion. The material is sprayed on again, and the beads are once more poured over the surface.

Parenthetically, it may be noted that the preferred size of the beads is about 0.006" in diameter. After the beads are poured over the surface, additional photoconductive material in one of the above-mentioned conventional lacquer suspensions is sprayed over the beads until they are completely immersed in the photoconductive material. The resulting complete layer, in the case of a single application of beads, is of the order of 0.010" in thickness. The baking of the photoconductive layer is not critical, but it may be done at about 350° C. for approximately four minutes. This process should be carried out at a temperature sufficiently high and a period sufficiently long to drive off volatile solvents contained in the oil and lacquer suspension. The photoconductive material is then sintered by firing the unit with no intervening cooling at about 650° C. for approximately 2¼ minutes. In this firing essentially all organic material is burned off.

Alternatively, a clear glass frit may be suspended in an oil vehicle of the type described immediately above and coated over the electroluminescent layer. Glass beads and photoconductor may then be applied, and the entire assembly fired, also as described above.

The temperature and time are relatively uncritical and may be varied inversely over a considerable range. Here it might be noted that the first baking of the photoconductive material at 350° C. reduces subsequent thermal shock when the firing for sintering purposes takes place.

The unit is then cooled in a dark area for about ten minutes. Again, the figures are not critical, but it is helpful if the first cooling takes place in an oven operated at about 200° C. After the unit is cooled, a mixture of rosin and alcohol is applied to the sintered photoconductive layer 24 to form a tacky surface to which a layer of gold leaf 28 adheres easily. The gold leaf is simply laid upon the tacky rosin and rolled down to establish proper electrical contact with the photoconductive layer. The thickness of the gold leaf is not critical, but leaf of about $18 \times 10^{-6}$" has proven to be quite satisfactory in a front-triggered storage device. After the application of the gold leaf, an electrode 30 made of fine wire mesh is tacked to the gold leaf 28 by means of a layer of wax 32 formed over and impregnated into the sintered layer.

A device constructed in the manner indicated above operates satisfactorily with exciting voltages of 175 to 250 volts at a frequency of 60 to 6,000 cycles per second. The pressure of the transparent conductive patches in the cell areas and between the photoconductive layer and the electroluminescent layer together with the black web substantially confines the lighted areas to the cells and cross talk is virtually eliminated. The presence of the glass beads in the photoconductive layer causes the path of incident light through the photoconductive material itself to be substantially shortened. In other words, incident light passes through an almost infinitesimally thin layer of photoconductive material until it enters the glass beads. Similarly, as the light emerges from the glass beads, it has a layer of photoconductive material of insignificant thickness to traverse. Moreover, incident light activates not only photoconductor above and below the beads, but the entire interfacial area between beads and photoconductor.

On the other hand, the electrical or resistive path through the photoconductive material is not at all shortened by the presence of the glass beads. The result of the various structural modifications is a highly efficient operating unit, both from the standpoint of optical and of electrical considerations.

Conventional light amplification or image conversion is also easily and efficiently provided. For such application, the black web 18 and the abraded areas on the blank 12 are eliminated, as are the conductive patches 22. However, there is interposed a complete opaque layer between the photoconductive and electroluminescent layers. The opaque layer may be made of the same material as the web 18 and is designed to eliminate regenerative action which would occur if light from the electroluminescent layer were permitted to be fed back to the photoconductive layer.

The general operation of a device of the type which includes a complete opaque layer between the electroluminescent and photoconductive layers is shown in the graph of FIG. 2. In the graph the log of output light is plotted against the log of incident light. The curved XYZ line indicates the dynamic characteristic curve of the device, or more specifically the change in light output from an individual electroluminescent element with the change in incident light on a photoconductive element. FIG. 2 also applies to a device with black webbing in which case the straight diagonal line shows the ratio between light transmitted through the structure to the photoconductive layer and light generated in the electroluminescent layer. This is known in the art as the feedback line. The feedback line intercepts the curved performance line at three points. These are labeled X, Y and Z. X is known as the lower minor cross-over point; Y, as the major cross-over point; and Z, the upper minor cross-over point.

In FIG. 3, the performance of a device of the type shown in FIG. 1 is graphically represented. The operation here depicted is of such a device employed as a front-triggered storage unit. Again, light output is plotted against light input on a logarithmic scale, the basic unit of light being foot-lamberts.

The straight diagonal line again is the feedback line and a family of curved performance lines are shown in their relation to the feedback line. The curves, reading from left to right, show performance with the application of 900, 800, 700, 600, 500 and 400 volts, respectively, to the device. The ratio of the capacity of the photoconductive layer to the capacity of the electroluminescent layer is about 0.2, and the frequency of the applied voltage is about 120 c.p.s.

Considering the 400-*volt* curve, the main and upper cross-over points are at C and D respectively and are so closely adjacent that even a very slight fluctuation in voltage may drop the light emission from the electroluminescent layer below the main cross-over point C. In such a case, lit areas will extinguish themselves. In contrast, considering the 600-volt curve with the main cross-over point being at E, the upper minor cross-over point falls beyond the graph at the upper right. The lower minor cross-over point is at F, and the result is that the two points E and F lie so closely adjacent that a slight voltage fluctuation may raise the light from the electroluminescent layer above the cross-over F and cause the whole device to light up.

As a median operating condition, the main cross-over point A between the 500-volt curve and the feedback slope may be considered. The actual cross-over is the "trigger point." That is to say that along the abscissa to the left of the main cross-over point, incident light is insufficient to "light" the device. At a lower minor cross-over point B, which occurs off the graph to the left, incident light is sufficient to give only slight conductivity to the photoconductive layer. The resulting capacitive division of voltage provides only a small voltage across the electroluminescent layer and the device is in the so-called stable "unlit" condition where only a very minimum of light output is discernible.

Also, at the main cross-over point A, incident light to the right along the abscissa will cause the device to light and to stay lit, even after the incident light is removed, feedback from the light emitted by the electroluminescent layer being sufficient to maintain the output. The brightness in the "lit" condition is determined by the upper minor cross-over point B.

The various cross-over points of the other voltage curves, such as C and D on the 400-volt curve or E and F on the 600-volt curve, indicate the versatility and limitations of the device in storage, display, erasure and light amplification. Any one of numerous functions are feasible with the unit. Furthermore, the location of the feedback slope line may be adjusted by varying component dimensions in the device to permit less or more light from the electroluminescent layer to reach the photoconductive layer and thus vary its resistance.

In FIG. 4, a family of calculated performance curves are graphically shown with the log of light output from the electroluminescent layer on the ordinate and the log of incident light on any given spot or cell of the unit of the abscissa.

Again, the straight diagonal line is representative of the feedback slope. In this instance, however, the curves reading from left to right are for varying capacity ratios. The first is for a capacity ratio between the photoconductive layer and the electroluminescent layer which is equal to 0.5. In the second, $C_{pc}/C_{el}=0.2$, and in the third, $C_{pc}/C_{el}$ is close to zero. Cross-over points between the curves and the feedback line are shown, and the first curve indicates that at a 0.5 ratio, no stable unlit condition is possible. In the second and third curves, two cross-over points are seen. Both stable lit and stable unlit areas of operation are available.

FIG. 5 illustrates still another family of calculated performance curves. Here the voltage is held constant at 600, the ratio of the capacities of the photoconductive layer and the electroluminescent layers is 0.2, and the frequency of the applied voltage is 60 cycles, 120 cycles, 400 cycles and 1000 cycles, taking the respective curves from left to right. The feedback slope line is again indicated by the diagonal line, and incident and output light are again plotted as before. Only a single cross-over point is indicated for each curve, and no stable lit conditions exist. The device can, of course, be lit by incident light, but the output light thereby generated will gradually decay when the incident light is removed.

Operability of the device in the fashion outlined is practical at any desired frequency from 60 to 1000 cycles per second over the range of incident light shown on the graph. Here again, values of incident light falling to the left of the cross-over points of the respective curves will not light the device, and values to the right of the cross-over points will cause the generation of output light.

Only the main cross-over point is shown for each curve in FIG. 5. The 60-cycle curve is nearly tangent to the feedback line, indicating that the lower minor cross-over and the main cross-over will coincide. Hence, the device will tend to light spontaneously if operated at 60 cycles. As the frequency increases, it is apparent from the curves that there will be increasing separation between the lower minor cross-over and the main cross-over. It is also apparent that the incident light necessary to trigger the device increases with frequency.

All forms of the device incorporating the invention are improved in their performance by the inclusion of transparent members in the photoconductive layer. In this connection, it is to be noted that incident light activates not only photoconducting material immediately above and below the members, but is reflected to activate the entire interfacial surface between photoconductor and transparent members.

Although what has been defined and illustrated constitutes a preferred embodiment of the invention, a reading of the foregoing specification will suggest numerous modifications of the device and process to those skilled in the art. Therefore, the invention should not be limited to the details of the embodiment shown and described, but only by the spirit and scope of the appended claims.

What is claimed is:

1. In an energy storage device having series arranged layers of photoconductive and electroluminescent material, the combination of a base transparent to said energy, means opaque to said energy overlying said base to divide said base into a plurality of cells and a plurality of patches transparent to said energy disposed between said photoconductive and electroluminescent layers and overlying said cells, said means opaque to said energy including a first webbing of opaque material disposed between said base and said electroluminescent layer and a second similar opaque webbing aligned with and on the opposite surface of said base from said electroluminescent layer.

2. A device as defined in claim 1 wherein a plurality of spheres transparent to said energy are imbedded in said photoconductive layer, each such sphere having its diameter of the same order of magnitude as that of the photoconductive layers.

3. An energy storage device comprising a base transparent to said energy, a first webbing of material opaque to said energy on one surface of said base and having openings through which said energy may pass, a transparent conductive film substantially covering the opposite surface of said base, a second webbing similar to and aligned with said first webbing disposed upon said transparent conductive film, an electroluminescent layer disposed upon said film and said second webbing, a plurality of transparent conductive patches disposed upon said electroluminescent layer in alignment with the openings in said webbing, a layer of photoconductive material disposed upon said electroluminescent layer and said second webbing, a plurality of spheres transparent to said energy incorporated within said photoconductive layer, gold leaf formed over said photoconductive layer, a wire mesh electrode in contact with said gold leaf for making electrical connection thereto, and a layer of wax formed over said gold leaf and a portion of said wire mesh, said base having an end thereof chamfered to permit electrical connection to said transparent conductive film.

References Cited by the Examiner

UNITED STATES PATENTS

| | | | |
|---|---|---|---|
| 2,495,697 | 1/1950 | Chilowsky | 250—213 X |
| 2,773,992 | 12/1956 | Ullery | 250—213 X |
| 2,897,399 | 7/1959 | Garwin et al. | 250—213 X |
| 2,929,934 | 3/1960 | Nicoll | 250—213 X |
| 2,942,120 | 6/1960 | Kazan | 250—213 |
| 2,948,816 | 8/1960 | Van Santen et al. | 250—213 |
| 3,015,036 | 12/1961 | Butler | 250—213 |
| 3,033,989 | 5/1962 | Kazan | 250—213 |
| 3,070,701 | 12/1962 | Wasserman | 250—213 X |

RALPH G. NILSON, *Primary Examiner.*

RICHARD M. WOOD, WALTER STOLWEIN,
*Examiners.*